United States Patent
Kim et al.

(10) Patent No.: US 9,887,594 B2
(45) Date of Patent: Feb. 6, 2018

(54) ELECTRONIC DEVICE FOR PERFORMING CHARGING AND METHOD FOR CONTROLLING THE SAME

(71) Applicant: Samsung Electronics Co., Ltd., Suwon-si, Gyeonggi-do (KR)

(72) Inventors: Jong-Min Kim, Incheon (KR); Kyeong-Jun Kim, Yongin-si (KR); Young-Jin Kim, Suwon-si (KR); Min-Kwon Jeong, Yongin-si (KR); Kyong-Hwan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/093,123

(22) Filed: Apr. 7, 2016

(65) Prior Publication Data

US 2016/0301242 A1    Oct. 13, 2016

(30) Foreign Application Priority Data

Apr. 9, 2015    (KR) .................... 10-2015-0050483

(51) Int. Cl.
  *H04B 1/38*    (2015.01)
  *H02J 50/80*   (2016.01)
  *H02J 7/00*    (2006.01)

(52) U.S. Cl.
  CPC ....... *H02J 50/80* (2016.02); *H02J 2007/0096* (2013.01)

(58) Field of Classification Search
  CPC ..................... H02J 50/80; H02J 2007/0096
  See application file for complete search history.

(56) References Cited

U.S. PATENT DOCUMENTS

| | | | |
|---|---|---|---|
| 2013/0093246 A1* | 4/2013 | Rostami | H02J 4/00 307/72 |
| 2013/0120630 A1 | 5/2013 | Kim et al. | |
| 2013/0281155 A1* | 10/2013 | Ogata | H04B 1/3883 455/556.1 |
| 2014/0159651 A1* | 6/2014 | Von Novak | H02J 7/025 320/108 |
| 2014/0312708 A1* | 10/2014 | Takahashi | H02J 50/60 307/104 |
| 2015/0207353 A1* | 7/2015 | Oku | H02J 7/0055 320/107 |
| 2015/0256226 A1* | 9/2015 | Lin | H04B 5/0037 307/104 |
| 2015/0310722 A1* | 10/2015 | Sousa | H02J 7/025 307/104 |
| 2016/0099614 A1* | 4/2016 | Leabman | H01Q 1/243 307/104 |
| 2016/0329755 A1* | 11/2016 | Park | H02J 7/025 |
| 2016/0336804 A1* | 11/2016 | Son | H02J 7/0027 |

FOREIGN PATENT DOCUMENTS

JP    2013-162672 A    8/2013

\* cited by examiner

*Primary Examiner* — Ajit Patel
(74) *Attorney, Agent, or Firm* — Jefferson IP Law, LLP (57) ABSTRACT

An electronic device for performing a charging is provided. The electronic device includes a charging module configured to receive power to perform a charging, a communication module configured to communicate with at least one other electronic device, and a processor configured to determine power to be received, based on a signal quality of a communication signal that is received in the communication module, and control the charging module to receive the determined power.

18 Claims, 7 Drawing Sheets

ELECTRONIC DEVICE FOR PERFORMING CHARGING AND METHOD FOR CONTROLLING THE SAME

CROSS-REFERENCE TO RELATED APPLICATION(S)

This application claims the benefit under 35 U.S.C. §119(a) of a Korean patent application filed on Apr. 9, 2015 in the Korean Intellectual Property Office and assigned Serial number 10-2015-0050483, the entire disclosure of which is hereby incorporated by reference.

TECHNICAL FIELD

The present disclosure relates to an electronic device that performs the charging and a control method thereof. More particularly, the present disclosure relates to an electronic device that performs charging by receiving the power from a power transmitter and a control method thereof.

BACKGROUND

Mobile terminals, such as mobile phones or personal digital assistants (PDAs), are, by nature, driven by a rechargeable battery, and in order to charge the battery, electric energy is supplied to the battery of the mobile terminal by using a separate charger. Typically, the battery and the charger are provided with separate contact ports on the outer surface thereof so that the contact ports come into contact with each other in order to electrically connect the charger with the battery.

However, since the contact ports protrude from the outer surface in the contact charging type, the contact ports tend to be easily contaminated with foreign substances, which may bring about a failure of the battery charging operation. In addition, exposing the contact ports to moisture disrupts the charging operation.

In order to solve the problems above, in recent years, wireless charging or contactless charging technology has been developed to be utilized in various electronic devices.

The wireless charging technology uses a wireless power transmission/reception system. For example, when a mobile phone is placed on a charging pad without being connected to a separate charging connector, the battery is able to be automatically charged. In general, the wireless charging technology is used for a cordless electric toothbrush or a cordless electric shaver, both of which are well known devices. Since the electronic devices are wirelessly charged according to the wireless charging technology, a waterproof function thereof may be enhanced. In addition, the portability of the electronic devices may be improved because a wired charger is not necessary. Wireless charging-related technology is expected to grow significantly in the coming electric vehicle era.

Wireless charging technology may be divided into an electromagnetic induction type using coils, a resonance type using resonances, and a radio frequency (RF)/micro-wave radiation type that converts electric energy into microwaves which are then transmitted.

Although the electromagnetic induction type has been widely used until now, they have recently succeeded in an experiment in which power is wirelessly transmitted tens of meters by using microwaves at home and abroad. Therefore, it is expected that all electronic devices may be wirelessly charged without cables, anytime and anywhere, in the near future.

Power transmission by electromagnetic induction may be made by power transmission between a primary coil and a secondary coil. According to the phenomenon in which a moving magnet near the coils generates an induction current, the magnetic field may be generated at a transmitting end, and a current may be induced due to a change in the magnetic field at a receiving end in order to thereby generate energy. This phenomenon is called magnetic induction, and power transmission using magnetic induction is excellent in energy transmission efficiency.

With regard to the resonance type, in 2005, Marin Soljačić, a professor in the Massachusetts Institute of Technology (MIT), announced a system in which power is wirelessly transmitted from a charger to an electronic device that is several meters away by using a resonant power transmission method with coupled mode theory. The wireless charging system of an MIT team uses the physical concept of a resonance, such as when a wine glass near a vibrating tuning fork oscillates in the same frequency as the tuning fork. The team has used electromagnetic waves containing electrical energy instead of sounds. Since the resonated electrical energy is directly transferred only when there is a device having the resonance frequency, and the unused portion thereof is re-absorbed into the electromagnetic field without spreading into the air, it is expected to not affect neighboring machines or a human body unlike other electromagnetic waves.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide mobile electronic devices including both a charging module for the wireless charging and a communication module for the communication. Therefore, the mobile electronic devices may perform the wireless charging while performing the communication. However, the charging noise, which is generated when wirelessly charging the battery, may deteriorate the quality of the communication signal. In particular, as the higher power is charged, the noise level affecting the communication signal increases.

In order to address the above-described problems or other problems, the present disclosure provides an electronic device for controlling the reception power and a control method thereof.

In accordance with an aspect of the present disclosure, an electronic device for performing a charging is provided. The electronic device includes a charging module configured to receive power to perform the charging, a communication module configured to communicate with at least one other electronic device, and a processor configured to determine power to be received, based on a signal quality of a communication signal that is received by the communication module, and control the charging module to receive the determined power.

In accordance with another aspect of the present disclosure, a control method of an electronic device for performing a charging is provided. The control method includes receiving power to perform the charging, communicating with at least one other electronic device, determining power to be received, based on a signal quality of a communication signal that is received through the communicating with the at least one other electronic device, and controlling the electronic device to receive the determined power.

In accordance with another aspect of the present disclosure, an electronic device for performing a charging is provided. The electronic device includes a charging module configured to receive power to perform the charging, an impedance matching circuit configured to adjust an impedance of the electronic device, a communication module configured to communicate with at least one other electronic device, and a processor configured to determine power to be received, based on a signal quality of a communication signal that is received by the communication module, and control the impedance matching circuit to receive the determined power.

Various embodiments of the present disclosure may provide an electronic device for controlling reception power and a control method thereof. Accordingly, the electronic device and a control method thereof, according to the present disclosure, can control the reception power in response to a signal quality in order to thereby perform high-power charging while maintaining the quality of the communication signal to be in a good state.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

Throughout the specification, the expressions "A or B," "at least one of A or/and B," "one or more of A or/and B," and the like may include all combinations of the listed items. For example, "A or B," "at least one of A and B," or "at least one of A or B" may refer to all cases of (1) including at least one A, (2) including at least one B, or (3) including both at least one A and at least one B.

The expressions "a first," "a second," "the first," "the second," and the like, used in various embodiments of the present disclosure, may modify various elements irrespective of order and/or importance thereof and do not limit the corresponding elements. The above expressions are used merely for the purpose of distinguishing an element from the other elements. For example, a first user device and a second user device may indicate different user devices irrespective of order or importance. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled," to another element (second element), there is no element (e.g., third element) interposed between them.

The expression "configured (or set) to," used in this specification, may be interchangeably used with, for example, "suitable for," "having the capacity to," "designed to," "adapted to," "made to," or "capable of," according to circumstances. The term "configured (or set) to" may not necessarily mean "specifically designed to" in hardware. Instead, in some cases, the expression "device configured to" may mean that the device "may be able to" together with other devices or components. For example, the phrase "processor adapted (or configured) to perform A, B, and C,"

may mean that a dedicated processor (e.g., an embedded processor) only performs the corresponding operations or a generic-purpose processor (e.g., a central processing unit (CPU) or an application processor (AP)) can perform the corresponding operations by executing one or more software programs stored in a memory device.

Terms used in this specification are merely used to describe a specific embodiment and may not be intended to limit the scope of another element. Singular forms may include plural forms unless the context clearly indicates otherwise. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Motion Picture Experts Group (MPEG-1 or MPEG-2) audio layer III (MP3) player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

In various embodiments of the present disclosure, an electronic device may be a smart home appliance. The smart home appliance may include at least one of, for example, a television (TV), a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to an embodiment of the present disclosure, the electronic device may include at least one of various medical devices (e.g., various portable medical measuring devices (e.g., a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, a gyro-compass, etc.), avionics, security devices, an automotive head unit, a robot for a home or an industry, an automatic teller's machine (ATM) in banks, point of sales (POS) in a shop, or internet device of things (e.g., a light bulb, various sensors, an electric or a gas meter, a sprinkler device, a fire alarm, a thermostat, a streetlamp, a toaster, sporting goods, a hot water tank, a heater, a boiler, etc.).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments of the present disclosure, the electronic device may be a combination of one or more of the aforementioned various devices. The electronic device, according to an embodiment of the present disclosure, may be a flexible electronic device. Further, the electronic device, according to an embodiment of the present disclosure, is not limited to the aforementioned devices and may include a new electronic device according to a technological advance.

Hereinafter, electronic devices, according to various embodiments of the present disclosure, will be described with reference to the accompanying drawings. As used herein, the term "user" may indicate a person who uses an electronic device or a device (e.g., an artificial intelligence electronic device) that uses an electronic device.

Figure 1:
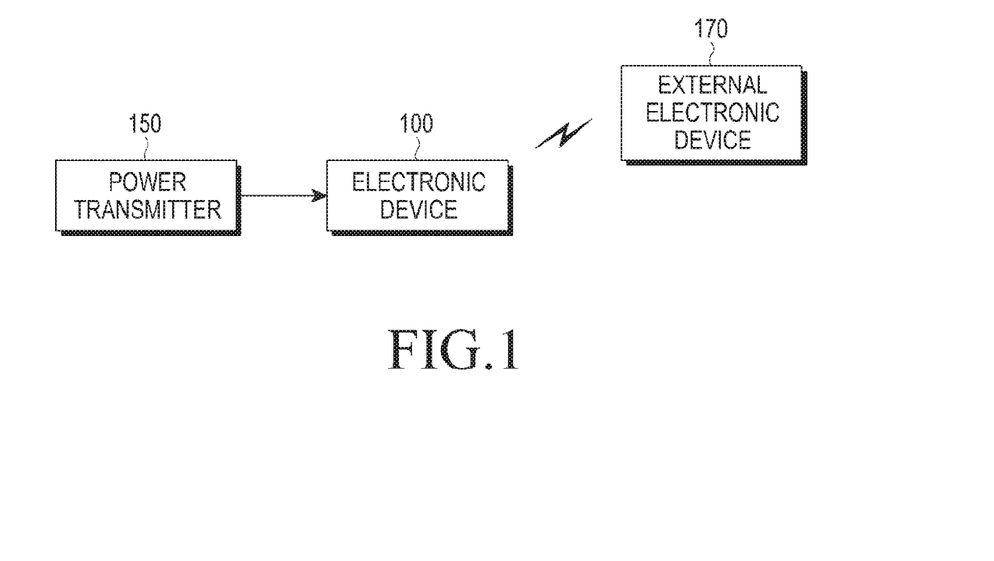
FIG. 1 is a conceptual diagram to explain the overall operations of a wireless charging system according to various embodiments of the present disclosure.

FIG. 1 illustrates a block diagram to explain a system including an electronic device according to various embodiments of the present disclosure.

Referring to FIG. 1, an electronic device 100, according to various embodiments of the present disclosure, may receive power from a power transmitter 150. Here, the electronic device 100 may receive the power in a wired or wireless manner from the power transmitter 150. That is, the electronic device 100 may perform a charging by using the power from the power transmitter 150. The electronic device 100 may be connected with the power transmitter 150 in a wired manner, and may receive the power from the power transmitter 150 through an incoming power transmission wire. Alternatively, the electronic device 100 may receive the power wirelessly from the power transmitter 150. The electronic device 100 may receive the power from the power transmitter 150 according to any one of a resonance type or an induction type, and there is no limitation on the wireless power receiving method. The electronic device 100 may store received power in the battery or use the same for the operation.

The electronic device 100 may communicate with an external electronic device 170. Here, the external electronic device 170 may be another mobile electronic device, a base station, or an access point (AP). The electronic device 100 may communicate with the external electronic device 170 by using at least one cellular communication protocol, such as long-term evolution (LTE), LTE-advanced (LTE-A), code division multiple access (CDMA), wideband-CDMA (WCDMA), universal mobile telecommunication system (UMTS), wireless broadband (WiBro), or global system for mobile communication (GSM). Alternatively, the electronic device 100 may communicate with the external electronic device 170 through at least one telecommunication network, such as computer networks (e.g., local area network (LAN) or wide area network (WAN)), the Internet, or a telephone network.

Figure 2:
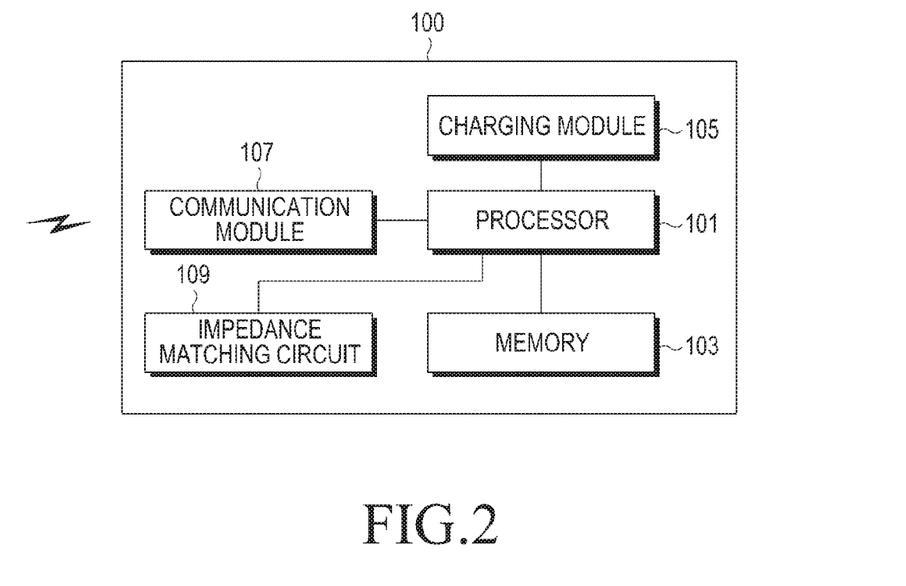
FIG. 2 is a block diagram of an electronic device, according to various embodiments of the present disclosure.

FIG. 2 illustrates a block diagram of the electronic device, according to various embodiments of the present disclosure.

Referring to FIG. 2, the electronic device 100 may include a processor 101, a memory 103, a charging module 105, and a communication module 107.

The processor 101 may include at least one of a CPU, an AP, or a communication processor (CP). The processor 101, for example, may perform a calculation or data processing related to the control and/or communication of other elements of the electronic device 100. The processor 101 may be referred to as a controller, or may include the controller as a part thereof.

The memory 103 may include a volatile and/or non-volatile memory. The memory 103, for example, may store instructions or data related to one or more elements of the electronic device 100. According to an embodiment of the present disclosure, the memory 103 may store software and/or programs. The programs, for example, may include a kernel, middleware, an application programming interface (API), and/or application programs (or "applications"). At least one of the kernel, the middleware, or the API may be referred to as an operating system (OS).

The communication module 107, for example, may configure communication between the electronic device 100 and an external device. For example, the communication module 107 may be connected to a network through wireless communication or wired communication in order to thereby communicate with the external device.

The wireless communications may use, as a cellular communication protocol, for example, at least one of LTE, LTE-A, CDMA, WCDMA, UMTS, WiBro, or GSM. The wired communication, for example, may include at least one of a universal serial bus (USB), a high definition multimedia interface (HDMI), recommended standard 232 (RS-232), or a plain old telephone service (POTS). The network may include one or more telecommunication networks, such as computer networks (e.g., LAN or WAN), the Internet, or a telephone network.

The charging module 105 may receive power from the power transmitter 150. The charging module 105 may include at least one of a power management integrated chip (PMIC), a charging integrated circuit (IC), and a battery. The charging module 105 may include an interface for wired charging, or may include a resonator for wireless charging. In the case where the electronic device 100 receives power wirelessly from the power transmitter 150, the charging module 105 may further include devices for processing the wireless power, such as a rectifier circuit, a direct current (DC)/DC converter, or the like. In this case, the charging module 105 may receive power from other external sources rather than the power transmitter 150.

According to various embodiments of the present disclosure, the charging module 105 may receive power from the power transmitter 150 in order to thereby perform a charging. The communication module 107 may communicate with at least one other electronic device. The processor 101 may determine reception power based on a signal quality of a communication signal that is received by the communication module 107, and may control the charging module 105 to receive the determined power.

In various embodiments of the present disclosure, the processor 101 may determine reception power based on association information between the signal quality of the received communication signal and the reception power.

According to various embodiments of the present disclosure, the memory 103 may store a first threshold to determine whether the signal quality of the received communication signal is poor. If it is determined that the signal quality of the received communication signal is less than the first threshold, the processor 101 may reduce the received power to be lower than a predetermined power.

Figure 5:
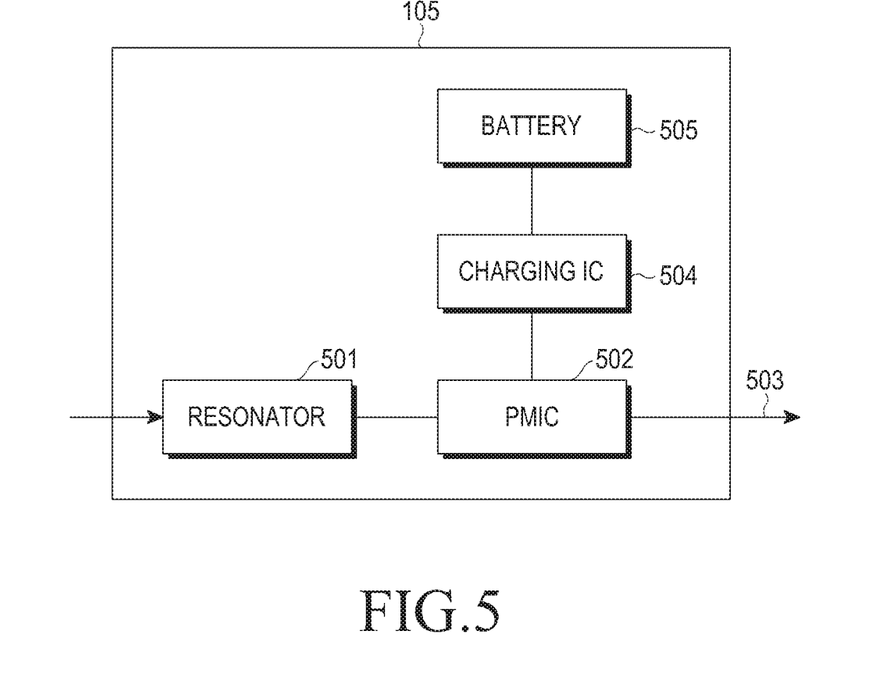
FIG. 5 is a block diagram of a charging module, according to various embodiments of the present disclosure.

According to various embodiments of the present disclosure, as illustrated in FIG. 5, the charging module 105 may include a battery 505 and a PMIC 502 that transfers received power to the battery 505, and the processor 101 may reduce the power that is transferred from the PMIC 502 to the battery 505.

According to various embodiments of the present disclosure, the processor 101 may reduce the received power to a predetermined value.

According to various embodiments of the present disclosure, the processor 101 may reduce the received power until the signal quality of the received communication signal becomes equal to, or greater than, the first threshold.

According to various embodiments of the present disclosure, the processor 101 may reduce the received power based on association information between the signal quality and the power to be reduced.

According to various embodiments of the present disclosure, the memory 103 may store a second threshold to determine whether the signal quality of the received communication signal is good, and if the signal quality of the received communication signal exceeds the second threshold, the processor may return the received power to a predetermined power.

According to various embodiments of the present disclosure, the second threshold may be greater than the first threshold, and the processor 101 may perform the returning of the received power to the predetermined power from a reduction state of the received power in a hysteresis operation.

In various embodiments of the present disclosure, the electronic device 100 may further include an impedance matching circuit 109 (FIG. 2) for adjusting the impedance of the electronic device 100. In this case, the processor 101 may determine reception power based on the signal quality of the communication signal that is received by the communication module 107, and may control the impedance matching circuit 109 to receive the determined power.

Figure 3:
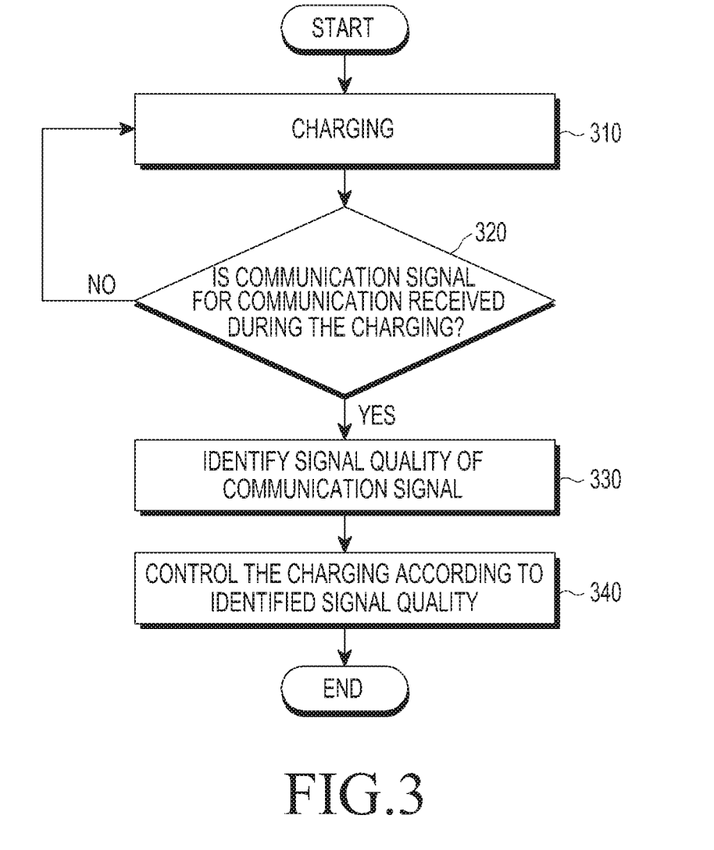
FIG. 3 is a flowchart illustrating a control method of the electronic device, according to various embodiments of the present disclosure.

FIG. 3 illustrates a flowchart of a control method of the electronic device, according to various embodiments of the present disclosure.

Referring to FIG. 3, in operation 310, the electronic device 100 may perform a charging. The electronic device 100 may perform the charging in a wired or wireless manner through power that is transmitted from the power transmitter 150.

In operation 320, the electronic device 100 may determine whether communication signals for a communication are received during the charging. The electronic device 100 may determine whether the communication signals are received according to whether energy or received signal strength indication (RSSI), which is detected in the communication module 107 of the electronic device 100, exceeds a threshold.

If it is determined that a communication signal is received during the charging, the electronic device 100 may identify the signal quality of the communication signal in operation 330. For example, the electronic device 100 may identify the signal quality based on the bit error ratio (BER) of the communication signal.

In operation 340, the electronic device 100 may control the charging according to the identified signal quality. In various embodiments of the present disclosure, the electronic device 100 may determine an amount of charging corresponding to the identified signal quality, and may control the charging module 105 to receive the determined amount of charging. Alternatively, the electronic device 100 may read out association information between the identified signal quality and the amount of charging, and may control the charging module 105 to receive the amount of charging corresponding to the signal quality based on the read association information. Alternatively, the electronic device 100 may increase or reduce the amount of charging from its current state. In this case, the increased or reduced amount of charging may be predetermined. The control of the amount of charging mentioned above will be described later in more detail.

Figure 4:
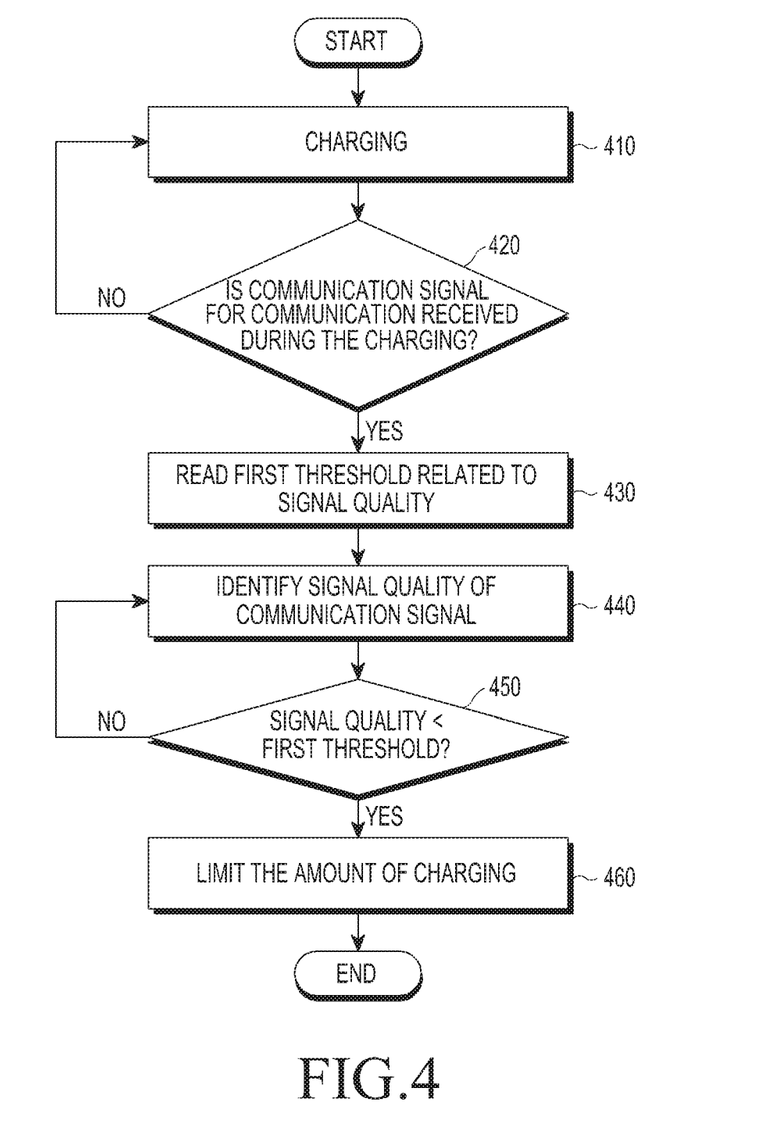
FIG. 4 is a flowchart illustrating a control method of the electronic device, according to various embodiments of the present disclosure.

FIG. 4 illustrates a flowchart of a control method of the electronic device, according to various embodiments of the present disclosure.

Referring to FIG. 4, in operation 410, the electronic device 100 may perform a charging. The electronic device 100 may perform the charging in a wired manner or a wireless manner through a wireless power transmitter 150.

In operation 420, the electronic device 100 may determine whether communication signals for a communication are received during the charging. The electronic device 100 may determine whether the communication signals are received according to whether energy or RSSI, which is detected in the communication module 107 of the electronic device 100, exceeds a threshold.

In operation 430, the electronic device 100 may read out a first threshold that is related to a signal quality from the memory 103. Here, the first threshold comprises a signal quality that may be determined to be a poor signal quality, and it may be pre-stored in the memory. The electronic device 100 may determine the first threshold adaptively to an environment. For example, the electronic device 100 may determine the first threshold to be a relatively low value in an area where it is difficult to communicate with a base station (for example, an area where signal quality is poor). Further, the electronic device 100 may determine the first threshold to be a relatively high value in an area where it is easy to communicate with a base station (for example, an area where signal quality is good).

In operation 440, the electronic device 100 may identify a signal quality of the communication signal. The electronic device 100 may continuously monitor the signal quality of the communication signal. In an embodiment of the present disclosure, the electronic device 100 may continue to monitor the BER of the communication signal. In operation 450, the electronic device 100 may determine whether the signal quality of the communication signal is less than the first threshold. If the signal quality of the communication signal is determined to be less than the first threshold, the electronic device 100 may control the charging module 105 to limit the amount of charging in operation 460. For example, the electronic device 100 may reduce the power that is transferred from the charging module to the battery in order to thereby limit the power received from the power transmitter 150. According to this, the power that is supplied to the battery and the devices for processing the charging power may be reduced, and noise generated from the battery and the devices for processing the charging power may decrease so that the communication signal quality becomes better than a previous system. In particular, in the case where power is wirelessly received, the intensity of the electromagnetic wave to be received may be reduced so that the quality of the communication signal can be better than before. Meanwhile, in the case of measuring the BER, if the BER exceeds a first predetermined threshold BER, the electronic device 100 may limit the amount of charging.

The electronic device 100, according to various embodiments of the present disclosure, may reduce received power to a predetermined power. In other words, the reduced power may be predetermined. In an embodiment of the present disclosure, the electronic device 100 may monitor the quality of a communication signal while continuously reducing power. In this case, the electronic device 100 may reduce the power until the quality of the communication signal is equal to, or greater than, the first threshold. In an embodiment of the present disclosure, the electronic device 100 may reduce the power based on association information between the difference between the first threshold and the signal quality, and the power to be reduced. For example, Table 1 illustrates an example of the association information between the difference between the first threshold and the signal quality, and the power to be reduced.

TABLE 1

| First Threshold - Signal Quality | Reduced Power |
|---|---|
| a | A |
| b | B |
| c | C |
| d | D |

For example, if the difference between the first threshold and the signal quality is 'c,' the electronic device may determine the reduced power to be 'C,' and may control the charging module to reduce the power as much as 'C.' Here, the reduced power (A to D) may have values to maintain the signal quality to be equal to, or greater than, the first threshold, which may be configured in advance through experiments.

Alternatively, the electronic device 100 may contain the association information between the signal quality and the power to be reduced as shown in Table 2.

TABLE 2

| Signal Quality | Reduced Power |
|---|---|
| e | A |
| f | B |
| g | C |
| h | D |

When the signal quality is determined to be less than the first threshold, the electronic device 100 may determine the power to be reduced based on the associated information shown in Table 2.

As described above, the electronic device 100, according to various embodiments of the present disclosure, may limit the received power in various manners, and thus, the quality of the communication signal can be maintained to be equal to, or greater than, the first threshold.

Meanwhile, the above-described embodiment is only an example, and the electronic device 100, according to various embodiments of the present disclosure, may control the amount of the received power to correspond to the measured signal quality without the comparison with the first threshold as described above.

FIG. 5 illustrates a block diagram of the charging module, according to various embodiments of the present disclosure.

Referring to FIG. 5, the charging module 105 may include a resonator 501, the PMIC 502, a charging IC 504, and the battery 505. In the embodiment of FIG. 5, the electronic device 100, for example, may wirelessly receive power, and thus may include the resonator 501. It may be easily understood by those skilled in the art that the charging module 105 may include an interface for a wired charging instead of the resonator 501 in the case where the electronic device 100 receives the power in a wired manner.

The resonator 501 may receive power wirelessly from the power transmitter 150. Resonator 501 may be set to have a predetermined resonance frequency, and may receive the power from the power transmitter 150 based on a resonance type or an induction type.

Meanwhile, in the case where the electronic device 100 receives the power through a cable, the interface (not shown) for the charging may receive the power through an incoming charging cable.

The PMIC 502 may output and distribute the received power to the battery 505 or the system 503. Here, the system 503 may refer to devices for the operation of the electronic device 100. The PMIC 502 may control the power that is transferred to the battery 505 according to the control of the processor. As described above, in various embodiments of the present disclosure, the electronic device, i.e., the processor 101, may determine the received power depending on the quality of the communication signal. The processor may control the power that is transferred from the PMIC 502 to the battery 505 according to the determined power. Alternatively, the processor may control the power that is directly transferred from the PMIC 502 to the battery 505 according to the quality of the communication signal. If the power that is transferred to the battery 505 increases or decreases, the power that is received by the resonator 501 or the interface (not shown) may increase or decrease as well.

In an embodiment of the present disclosure, the electronic device, i.e., the processor 101, may control the power that is transferred from the PMIC 502 to the battery 505 when the signal quality is less than the first threshold. As described above, the processor may reduce the received power to a predetermined power. Alternatively, the processor may monitor the quality of the communication signal while continuously reducing the power. In this case, the processor may reduce the power until the quality of the communication signal becomes equal to, or greater than, the first threshold. In an embodiment of the present disclosure, the processor 101 may reduce the power based on associated information between a difference between the first threshold and the signal quality, and the power to be reduced, or based on associated information between the signal quality and the power to be reduced.

Figure 6:
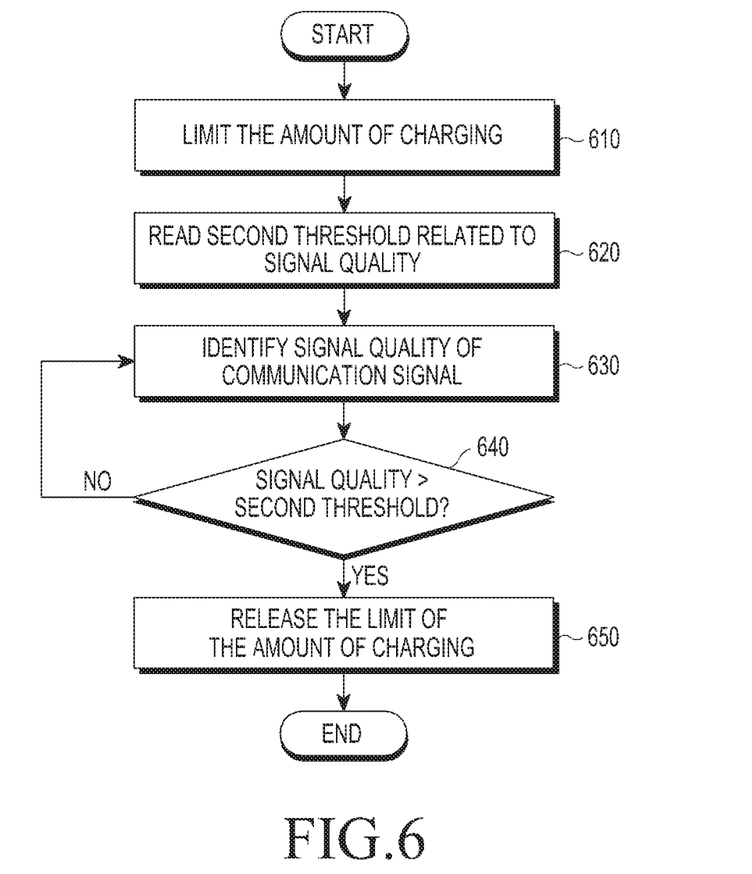
FIG. 6 is a flowchart illustrating a control method of the electronic device, according to various embodiments of the present disclosure.

FIG. 6 is a flowchart illustrating a control method of the electronic device, according to various embodiments of the present disclosure.

Referring to FIG. 6, in operation 610, the electronic device 100 may limit the amount of charging. For example, the electronic device 100 may determine that the signal quality of the communication signal is less than the first threshold, and may reduce the received power.

In operation 620, the electronic device 100 may read out a second threshold, which is related to the signal quality. Here, the second threshold comprises a signal quality for releasing a limit of the amount of charging, which may be predetermined. The second threshold may be different from the first threshold, and, for example, may be greater than the first threshold. Accordingly, the electronic device 100 may perform the limiting of the amount of charging and the releasing thereof in a hysteresis operation. Meanwhile, in an embodiment of the present disclosure, the second threshold may be the same as the first threshold. Meanwhile, when the electronic device 100 measures the BER, the electronic device 100 may determine whether the BER is less than the second threshold. If the BER is less than the second threshold, the electronic device 100 may release the limit of the power. That is, the electronic device 100 may return the power to a predetermined value.

In operation 630, the electronic device 100 may check the signal quality of the communication signal. The electronic device 100 may continuously monitor the signal quality of the communication signal. In operation 640, the electronic device 100 may determine whether the signal quality exceeds the second threshold.

If the signal quality is determined to exceed the second threshold, the electronic device 100 may release the limit of the amount of charging in operation 650. That is, the electronic device 100 may control the power transferred from the PMIC to the battery according to an initially configured value.

Figure 7:
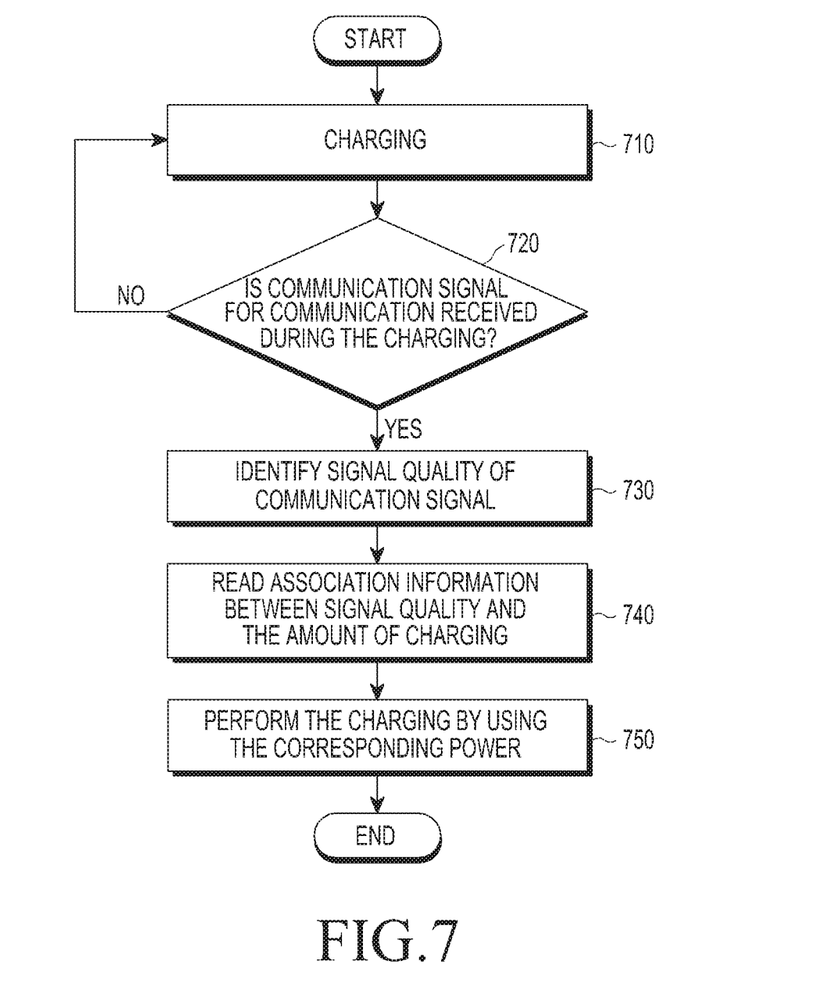
FIG. 7 is a flowchart illustrating a control method of the electronic device, according to various embodiments of the present disclosure.

FIG. 7 is a flowchart illustrating a control method of the electronic device, according to various embodiments of the present disclosure.

Referring to FIG. 7, in operation 710, the electronic device 100 may perform a charging. The electronic device 100 may perform the charging in a wired manner or a wireless manner by using power that is received from the wireless power transmitter 150.

In operation 720, the electronic device 100 may determine whether communication signals for the communication are received during the charging. The electronic device 100 may determine whether the communication signals are received according to whether the energy or RSSI, which is detected in the communication module of the electronic device, exceeds a threshold.

If it is determined that the communication signal is received during the charging, the electronic device 100 may identify a signal quality of the communication signal in operation 730. For example, the electronic device 100 may continue to monitor the BER of the communication signal.

In operation 740, the electronic device 100 may read out association information between the signal quality and the amount of charging. Table 3 shows an example of the association information between the signal quality and the amount of charging.

TABLE 3

| Signal Quality | Power |
| --- | --- |
| e | E |
| f | F |
| g | G |
| h | H |

For example, if the signal quality is measured to be 'f,' the electronic device 100 may control the charging module such that the received power becomes 'F.' Accordingly, the electronic device 100 may directly control the charging module without the comparison with the threshold. In an embodiment of the present disclosure, the electronic device 100 may store association information as shown in Table 4.

TABLE 4

| Signal Quality | Power transferred to battery from PMIC |
| --- | --- |
| e | I |
| f | J |
| g | K |
| h | L |

For example, if the signal quality is measured to be 'f,' the electronic device 100 may directly control the charging module such that the power that is transferred from the PMIC to the battery becomes 'J.'

In operation 750, the electronic device 100 may perform the charging by using the corresponding power.

Figure 8:
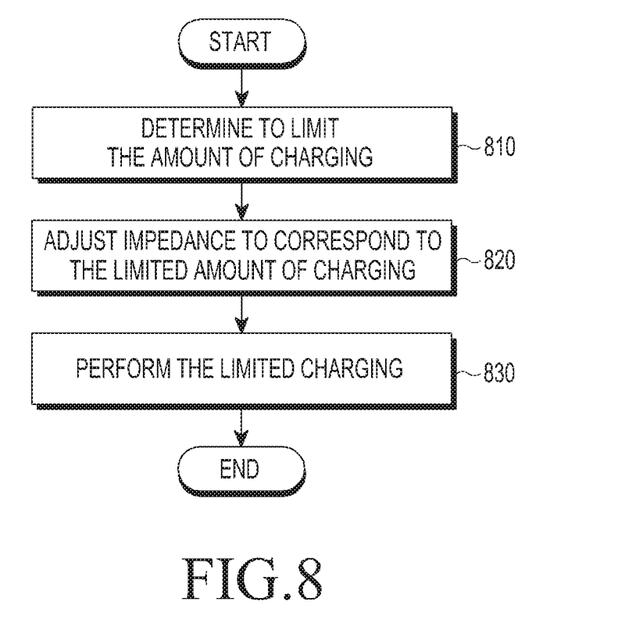
FIG. 8 is a flowchart illustrating a control method of the electronic device, according to various embodiments of the present disclosure.

FIG. 8 is a flowchart illustrating a control method of the electronic device, according to various embodiments of the present disclosure.

Referring to FIGS. 2 and 8, the electronic device 100 may include an impedance matching circuit 109 for impedance matching. The electronic device 100 may perform impedance matching in order to optimize the charging, and may control the impedance matching circuit 109 in order to thereby change the impedance of the electronic device 100.

In operation 810, the electronic device 100 may determine that the amount of charging is to be limited. For example, the electronic device 100 may determine that a signal quality of a communication signal is less than a first threshold, and may determine that the amount of charging is to be limited.

In operation 820, the electronic device 100 may control the impedance matching circuit 109 to adjust the impedance to correspond to the determined limited amount. For example, the electronic device 100 may change a first impedance state, which is set as the optimal state, to a second impedance state in order to thereby control to reduce the received power.

In operation 830, the electronic device 100 may perform a limited charging operation. According to the description above, the electronic device 100 may reduce the received power by using methods other than the method of reducing power that is transferred to the battery.

According to various embodiments of the present disclosure, a control method of an electronic device for perform a charging is provided. The method includes receiving power to perform the charging, communicating with at least one other electronic device, determining power to be received, based on a signal quality of a communication signal that is received through the communicating with the at least one other electronic device; and controlling the electronic device to receive the determined power.

According to various embodiments of the present disclosure, the operation of determining the received power based on the signal quality of the communication signal that is received through the communication may include an operation of determining the received power based on association information between the signal quality of the received communication signal and the received power.

Here, the communication signals may be, but are not limited to, digital multimedia broadcasting (DMB) signals, RF signals, various short-range communication signals, or $3^{rd}$ generation partnership project (3GPP) standard protocol signals.

According to various embodiments of the present disclosure, the operation of determining the received power based on the signal quality of the communication signal that is received through the communication may include, if the signal quality of the received communication signal is determined to be less than a first threshold, reducing the received power to be lower than a predetermined power, and the first threshold may determine that the signal quality of the communication signal is poor.

According to various embodiments of the present disclosure, the operation of determining the received power based on the signal quality of the communication signal that is received through the communication may include reducing the received power to a predetermined value.

According to various embodiments of the present disclosure, the operation of determining the received power based on the signal quality of the communication signal that is received through the communication may include reducing the received power until the communication signal quality becomes equal to, or greater than, the first threshold.

According to various embodiments of the present disclosure, the operation of determining the received power based on the signal quality of the communication signal that is received through the communication may include reducing the received power based on association information between the signal quality and the received power.

According to various embodiments of the present disclosure, the operation of determining the received power based on the signal quality of the communication signal that is received through the communication may include, if the signal quality of the received communication signal exceeds a second threshold, returning the received power to a predetermined power, and the second threshold may determine that the signal quality is good. The second threshold may be greater than the first threshold. The operation of determining the received power based on the signal quality of the communication signal that is received through the communication may include performing the returning of the received power to the predetermined power from a reduction state of the received power in a hysteresis operation.

Each of the components of the electronic device according to the present disclosure may be implemented by one or more components and the name of the corresponding component may vary depending on a type of the electronic device. In various embodiments of the present disclosure, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application specific integrated circuit (ASIC) chip, field programmable gate arrays (FPGA), and a programmable-logic device for performing operations which have been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by one or more processors (for example, the processor 101), the one or more processors may execute a function corresponding to the command. The computer-readable storage medium may be, for example, the memory 103.

The computer readable recoding medium may include a hard disk, a floppy disk, magnetic media (e.g., a magnetic tape), optical media (e.g., a compact disc read only memory (CD-ROM) and a DVD), magneto-optical media (e.g., a floptical disk), a hardware device (e.g., a ROM, a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the disclosure, a storage medium may store instructions that are executed by one or more processors in order to thereby allow the one or more processors to perform operations of: receiving power to perform a charging; communicating with at least one other electronic device; determining power to be received, based on a signal quality of a communication signal that is received through the communicating with the at least one other electronic device; and controlling the electronic device to receive the determined power.

While the present disclosure has been shown and described with reference to various embodiments thereof, it will be understood by those skilled in the art that various changes in form and detail may be made therein without departing from the spirit and scope of the present disclosure defined by the appended claims and their equivalents.

What is claimed is:

1. An electronic device for performing a charging, the electronic device comprising:
    a charging module configured to perform the charging by receiving power from a power transmitter;
    a communication module configured to communicate with at least one other electronic device; and
    a processor configured to:
    determine a signal quality of a communication signal received by the communication module, and
    adjust a magnitude of the power to be received by the charging module, based on the signal quality of the communication signal, for improving the signal quality of the communication signal; and
    a memory configured to store a first threshold to determine whether the signal quality of the received communication signal is poor,
    wherein the signal quality of the communication signal is affected by the power received for the charging, and
    wherein, if the signal quality of the received communication signal is determined to be less than the first threshold, the processor is further configured to reduce the received power to be lower than a predetermined power.

2. The electronic device of claim 1, wherein the processor is further configured to determine the power to be received based on association information between the signal quality of the received communication signal and the received power.

3. The electronic device of claim 1, wherein the charging module comprises:
    a battery; and
    a power management integrated chip (PMIC) configured to transfer the received power to the battery, and
    wherein the processor is further configured to reduce the power that is transferred from the PMIC to the battery.

4. The electronic device of claim 1, wherein the processor is further configured to reduce the received power to a predetermined value.

5. The electronic device of claim 1, wherein the processor is further configured to reduce the received power until the signal quality of the received communication signal becomes greater than, or equal to, the first threshold.

6. The electronic device of claim 1, wherein the processor is further configured to reduce the received power based on association information between the signal quality of the received communication signal and the power to be reduced.

7. The electronic device of claim 1,
    wherein the memory is further configured to store a second threshold to determine whether the signal quality of the received communication signal is good, and
    wherein, if the signal quality of the received communication signal exceeds the second threshold, the processor is further configured to return the received power to a predetermined power.

8. The electronic device of claim 7, wherein the second threshold is greater than the first threshold.

9. The electronic device of claim 8, wherein the processor is further configured to perform the returning of the received power to the predetermined power from a reduction state of the received power in a hysteresis operation.

10. The electronic device of claim 1, wherein the processor is further configured to determine whether at least one communication signal for performing a communication is received during the performing of the charging.

11. The electronic device of claim 10, wherein the processor is further configured to determine whether the at least one communication signal for performing a communication is received during the performing of the charging based on whether one of energy and received signal strength indication (RSSI), which is detected by the communication module, exceeds a threshold.

12. A control method of an electronic device for performing a charging, the method comprising:
    performing the charging by receiving power from a power transmitter; communicating with at least one other electronic device, via a communication module included in the electronic device;
    determining a signal quality of a communication signal received by the communication module; and
    adjusting a magnitude of the power to be received, based on the signal quality of the communication signal, for improving the signal quality of the communication signal,
    wherein the signal quality of the communication signal is affected by the power received for the charging,
    wherein the adjusting of the magnitude of the power to be received comprises, if the signal quality of the received communication signal is determined to be less than a first threshold, reducing the received power to be lower than a predetermined power, and
    wherein the first threshold determines whether the signal quality of the received communication signal is poor.

13. The method of claim 12, wherein the adjusting of the magnitude of the power to be received comprises determining the power to be received based on association information between the signal quality of the received communication signal and the received power.

14. The method of claim 12, wherein the adjusting of the magnitude of the power to be received comprises reducing the received power to a predetermined value.

15. The method of claim 12, wherein the adjusting of the magnitude of the power to be received comprises reducing the received power until the signal quality of the received communication signal becomes greater than, or equal to, the first threshold.

16. The method of claim 12, wherein the adjusting of the magnitude of the power to be received comprises reducing the received power based on association information between the signal quality of the received communication signal and the received power.

17. The method of claim 12,
wherein the adjusting of the magnitude of the power to be received comprises, if the signal quality of the received communication signal exceeds a second threshold, returning the received power to a predetermined power, and
wherein the second threshold determines whether the signal quality of the received communication signal is good.

18. An electronic device for performing a charging, the electronic device comprising:
a charging module configured to perform the charging by receiving power from a power transmitter;
an impedance matching circuit configured to adjust an impedance of the electronic device;
a communication module configured to communicate with at least one other electronic device; and
a processor configured to:
determine a signal quality of a communication signal received by the communication module, and
control the impedance of the impedance matching circuit to adjust a magnitude of the power to be received by the charging module, based on the signal quality of the communication signal for improving the signal quality of the communication signal; and
a memory configured to store a first threshold to determine whether the signal quality of the received communication signal is poor,
wherein the signal quality of the communication signal is affected by the power received for the charging, and
wherein, if the signal quality of the received communication signal is determined to be less than the first threshold, the processor is further configured to reduce the received power to be lower than a predetermined power.

\* \* \* \* \*